United States Patent
Zhu et al.

(10) Patent No.: US 7,925,297 B2
(45) Date of Patent: Apr. 12, 2011

(54) TXOP DURATION ADAPTATION FOR DUAL RADIO DEVICES

(75) Inventors: Jing Zhu, Hillsboro, OR (US); Xue Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1064 days.

(21) Appl. No.: 11/717,599

(22) Filed: Mar. 13, 2007

(65) Prior Publication Data

US 2008/0227488 A1 Sep. 18, 2008

(51) Int. Cl.
*H04M 1/00* (2006.01)

(52) U.S. Cl. .................. 455/553.1; 455/552.1

(58) Field of Classification Search ............... 455/553.1, 455/552.1
See application file for complete search history.

(56) References Cited

U.S. PATENT DOCUMENTS

| | | | | |
|---|---|---|---|---|
| 6,643,522 B1 * | 11/2003 | Young | ......................... | 455/552.1 |
| 6,895,255 B1 * | 5/2005 | Bridgelall | ................... | 455/552.1 |
| 6,975,667 B2 * | 12/2005 | Mattisson et al. | ............. | 375/132 |
| 7,187,923 B2 * | 3/2007 | Mousseau et al. | ............ | 455/416 |
| 7,330,735 B2 * | 2/2008 | Glazko et al. | ............... | 455/552.1 |
| 7,519,364 B2 * | 4/2009 | Nair et al. | ................... | 455/432.1 |
| 7,526,313 B2 * | 4/2009 | Mousseau et al. | .......... | 455/552.1 |
| 2004/0259589 A1 * | 12/2004 | Bahl et al. | .................. | 455/553.1 |

* cited by examiner

*Primary Examiner* — Nick Corsaro
*Assistant Examiner* — Sowmini Nair
(74) *Attorney, Agent, or Firm* — Thorpe North & We

(57) ABSTRACT

Transmission opportunity (TXOP) duration is adapted for a wireless local area network (WLAN) transceiver in a dual radio wireless device based on an end of free time indication associated with a wireless wide area network (WWAN) transceiver within the same device. In this manner, the occurrence of collisions between WLAN communication activity and WLAN communication activity within the dual radio device may be reduced or eliminated.

16 Claims, 4 Drawing Sheets

TXOP DURATION ADAPTATION FOR DUAL RADIO DEVICES

TECHNICAL FIELD

The invention relates generally to wireless communication and, more particularly, to techniques for supporting co-existence between multiple radios located in the same device.

BACKGROUND OF THE INVENTION

Many modern communication devices support operation in multiple different wireless technologies. In many cases, it may be desirable to operate using two different wireless technologies at the same time. A problem that may arise with such concurrent operation is that one of the wireless technologies may interfere with the other. Such interference may occur even if the two wireless technologies operate within different frequency bands. Techniques are needed for reducing the amount of interference that may occur when two different wireless technologies are operative within a single device.

DETAILED DESCRIPTION

Figure 1:
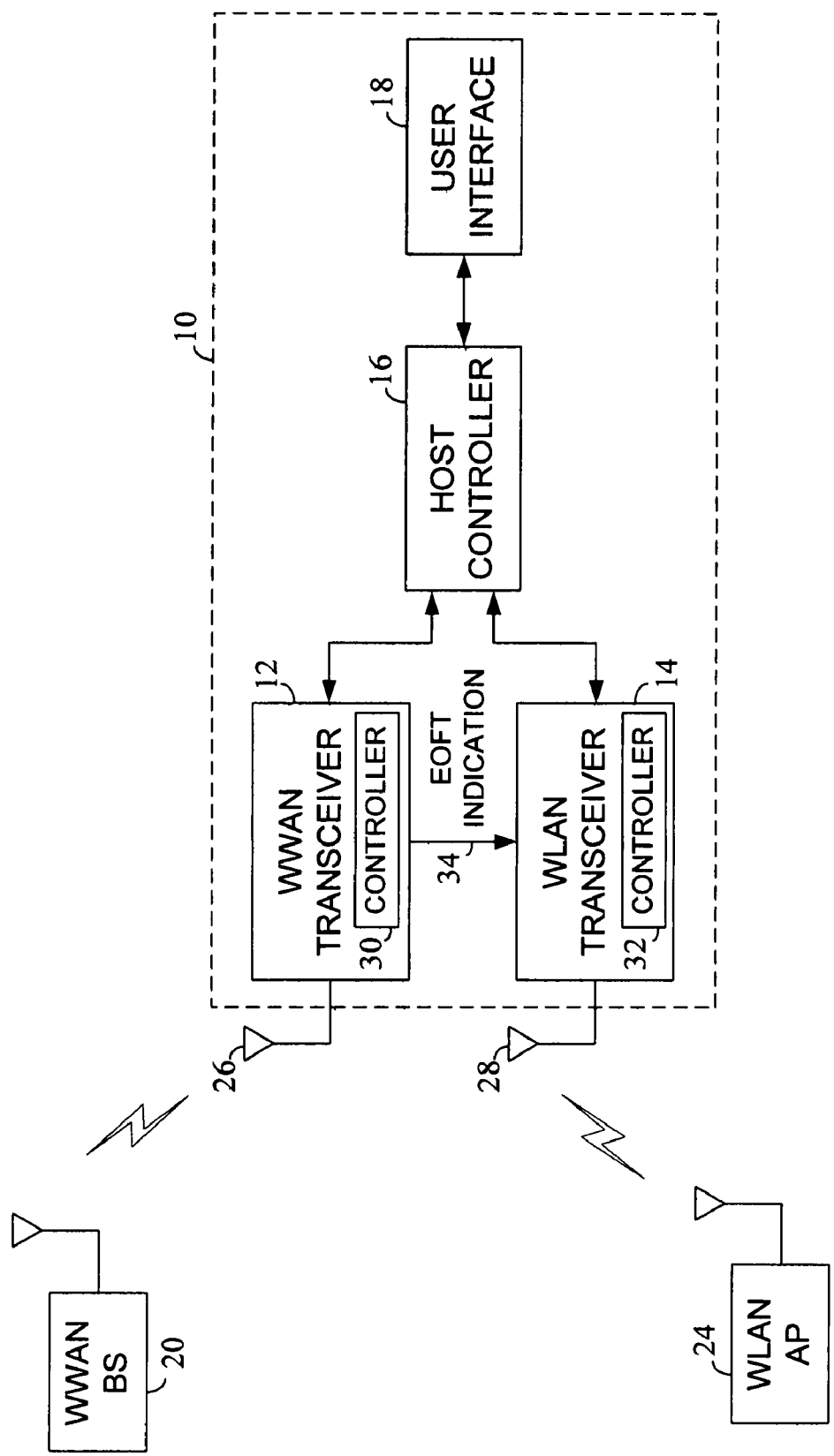
FIG. 1 is a block diagram illustrating an example dual radio device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example dual radio wireless device 10 in accordance with an embodiment of the present invention. As illustrated, the device 10 includes a first wireless transceiver 12, a second wireless transceiver 14, a host controller 16, and a user interface 18. The first wireless transceiver 12 and the second wireless transceiver 14 are each adapted for use with a different wireless networking or wireless cellular standard. For example, in the illustrated embodiment, the first wireless transceiver 12 is a WWAN transceiver (e.g., IEEE 802.16, 3G/4G, etc.) and the second wireless transceiver 14 is a WLAN transceiver (e.g., IEEE 802.11x). Slight modification of the underlying standards may be required to implement features of the invention. Other combinations of wireless standards may also be used. Although not illustrated, in some embodiments of the invention, there may also be some sharing of circuitry between the first and second wireless transceivers 12, 14. For example, in at least one embodiment, the first and second wireless transceivers 12, 14 share a radio frequency (RF) front end.

The first and second wireless transceivers 12, 14 may each include a corresponding controller 30, 32 to control local functions of the units. The host controller 16 is operative for performing an overall control function for the device 10. The host controller 16 may also execute an operating system, user applications, and/or perform other data processing, storage, and manipulation functions for the device 10. The controllers 30, 32, 16, when present, may each be implemented using one or more digital processors such as, for example, a digital signal processor (DSP), a general purpose microprocessor, a reduced instruction set computer (RISC), a complex instruction set computer (CISC), a field programmable gate array (FPGA), a application specific integrated circuit (ASIC), and/or others, including combinations of the above. The user interface 18 is operative for providing an interface between the device 10 and a user of the device and may include various input/output structures such as, for example, a keypad, a keyboard, a mouse, a display, a joystick, a track ball, a speaker, a microphone, a sound card, and/or others.

During typical device operation, the first transceiver 12 may communicate wirelessly with a remote WWAN base station (BS) 20. Similarly, the second transceiver 14 may communicate wirelessly with a remote WLAN access point (AP) 24. Peer to peer communication may also be used. As shown, the WWAN transceiver 12 may be coupled to one or more antennas 26 to facilitate the transmission and/or reception of wireless signals to/from the wireless medium. Similarly, the WLAN transceiver 14 may be coupled to one or more antennas 28. Any type of antennas may be used including, for example, a dipole, a patch, a helical antenna, an antenna array, and/or others. Multiple input/multiple output (MIMO) techniques may also be employed. A problem that arises with a dual radio wireless communication arrangement, such as that illustrated in FIG. 1, is that communication activity associated with one of the radios/wireless standards may cause interference with the activity of the other radio/wireless standard, or vice versa. This may occur even in situations where the operational frequency ranges of the two wireless standards are different and non-overlapping. This interference can seriously impact the communication performance for one or both of the radios being used. In accordance with one aspect of the present invention, techniques and structures are provided that are capable of reducing interference between the wireless technologies being implemented within a dual radio device.

Figure 2:
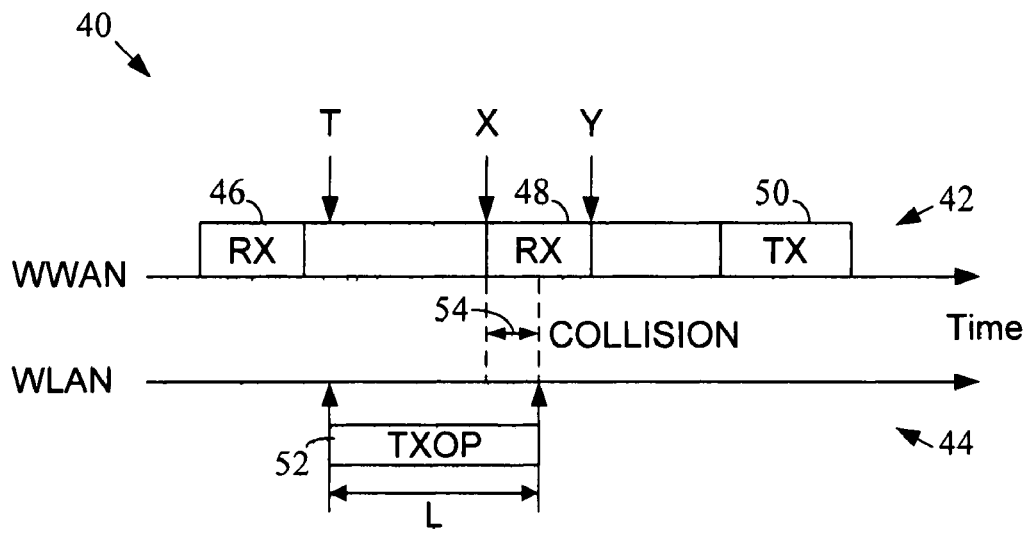
FIG. 2 is a diagram illustrating example communication activity within a dual radio device that supports both WLAN and WWAN communication.

FIG. 2 is a diagram illustrating example communication activity within a dual radio device that supports both WLAN and WWAN communication. As is known, WLAN communication (e.g., IEEE 802.11x, etc.) is typically a contention-based technology where user devices each contend for a wireless medium in a distributed manner. WWAN communication (e.g., IEEE 802.16, 3G/4G, etc.), on the other hand, is a scheduling-based technology where communication activity is scheduled beforehand by a centralized authority. In FIG. 2, an upper graph illustrates example scheduled WWAN communication activity 42 and a lower graph illustrates WLAN communication activity for the dual radio wireless device. As shown, the WWAN activity 42 includes first and second receive frames 46, 48 during which the WWAN transceiver within the dual radio device will receive data and a transmit frame 50 during which the WWAN transceiver will transmit data. The WLAN transceiver within the dual radio device may determine, at time T, that it is ready to commence transmission (e.g., after a backoff period has already expired). At this point, a fixed duration transmission opportunity (TXOP) 52 is initiated. The TXOP is an interval of time during which a device has the right to initiate frame exchange sequences on a wireless medium. As shown, there is a temporal overlap 54 between the fixed duration WLAN TXOP 52 and the second receive frame 48 of the WWAN communication activity 42. This overlap between the communication activity of the two wireless transceivers can result in a collision that reduces the quality of the communication for one or both of the wireless technologies. It is desirable that such collisions be avoided. As described previously, in some systems, some circuitry (e.g., an RF front end, etc.) may be shared by the various wireless technologies being implemented within a dual radio device. In such systems, it may not be possible to support the overlap between wireless communication activity within a dual radio device.

Figure 3:
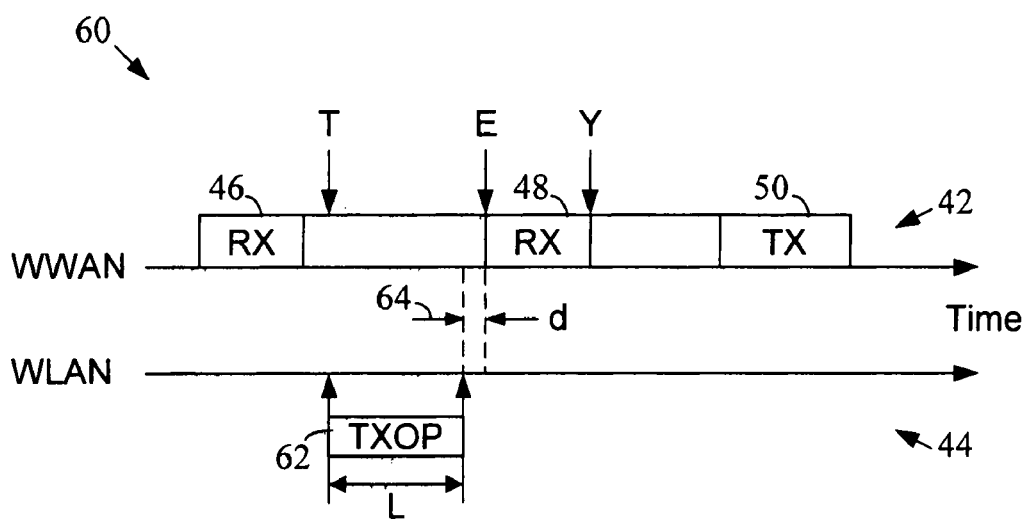
FIG. 3 is a diagram illustrating example communication activity within a dual radio device that supports both WLAN and WWAN communication in accordance with an embodiment of the present invention.

FIG. 3 is a diagram illustrating example communication activity within a dual radio device that supports both WWAN and WLAN communication in accordance with an embodiment of the present invention. As in FIG. 2, an upper graph in FIG. 3 illustrates scheduled WWAN communication activity 42 and a lower graph illustrates WLAN communication activity 44 for the dual radio device. As before, the WWAN communication activity 42 includes first and second receive frames 46, 48 and a transmit frame 50. The WLAN transceiver within the dual radio device will defer to this scheduled WWAN activity and only permit communication within the free periods of the WWAN activity. As shown in FIG. 3, for example, the WLAN transceiver may determine at time T that WLAN transmission is to commence. The WLAN transceiver may then calculate a duration (L) for a TXOP 62 that will end before the WWAN free time expires (the WWAN free time being the time when the WWAN transceiver is neither receiving nor transmitting). The WLAN transceiver is then permitted to transmit during this TXOP 62 (a similar approach may be used during WLAN receive (downlink) operations). Because there is no overlap between the WLAN activity 44 and the WWAN activity 42, no collisions occur that could otherwise reduce communication performance. In addition, because there is no overlap between the WLAN activity and the WWAN activity, the WLAN transceiver and the WWAN transceiver can share some circuitry (such as RF front end circuitry, etc.) that could not be shared if overlap was present.

To allow the duration of the TXOP 62 to be calculated in this manner, the WLAN transceiver obtains information as to the end of the current free time of the WWAN activity. As described previously, because the WWAN uses scheduling, the timing of the WWAN activity is typically known beforehand. Some of this timing information can be delivered from the WWAN transceiver to the WLAN transceiver for use in calculating the duration of the TXOP 62 (e.g., see line 34 in FIG. 1). This delivery of timing information can be achieved by, for example, sharing memory between the WWAN transceiver and the WLAN transceiver, by using general purpose input/output (GPIO) pins, or in some other manner. The information that is communicated to the WLAN transceiver should be indicative of the end of the free time of the WWAN communication activity 42. This end of free time information needs to be kept updated to avoid errors in the calculated value of the TXOP. In at least one embodiment of the invention, the WWAN transceiver sends information about the end of the WWAN free time to the WLAN transceiver every time there is a change in the end of free time information. When the WWAN transceiver is currently active (receiving or transmitting), the end of free time may be set to the current time to indicate that there presently is no free time. The end of free time indication can usually be extracted from the header of the WWAN frame (e.g., the uplink MAP and/or downlink MAP in the header of a WiMAX frame) by the WWAN transceiver.

In at least one embodiment of the present invention, the WLAN transceiver calculates the duration L of the TXOP 62 using the following equation:

$$L = \min(E-T-d, L_{MAX})  \qquad \text{Equation 1}$$

where E is the updated end of free time for the WWAN activity, T is the current time, d is a guard interval, $L_{MAX}$ is the maximum TXOP duration, and min(a,b) is the function that selects the lowest of the listed elements a and b. With reference to FIG. 3, the WLAN transceiver may determine that transmit or receive activity is to be performed at current time T. The WLAN transceiver may then obtain the present value of E which, in this example, would be the start time of the WWAN receive frame 48. To calculate the TXOP duration, the WLAN transceiver may subtract the present time T and the guard interval d from the end of free time value E. The resulting difference value is then compared to the maximum TXOP duration $L_{MAX}$. The smaller of the two values is then selected as the calculated TXOP duration L. The value of $L_{MAX}$ will typically be determined by hardware limitation and/or standard specification. There may also be a minimum TXOP duration $L_{MIN}$. If so, and the calculated duration L is below the minimum, then the communication operation of the WLAN transceiver may be cancelled (i.e., the available TXOP duration is not long enough). The value of $L_{MIN}$ will also typically be determined by hardware limitation and/or standard specification. As stated above, if the WWAN transceiver is currently active, then E is set to T. When this occurs, the calculated TXOP duration L will be equal to −d, which is less than $L_{MIN}$ (which is a positive value). This will result in cancellation of the current WLAN communication operation when the WWAN transceiver is active.

Figure 4:
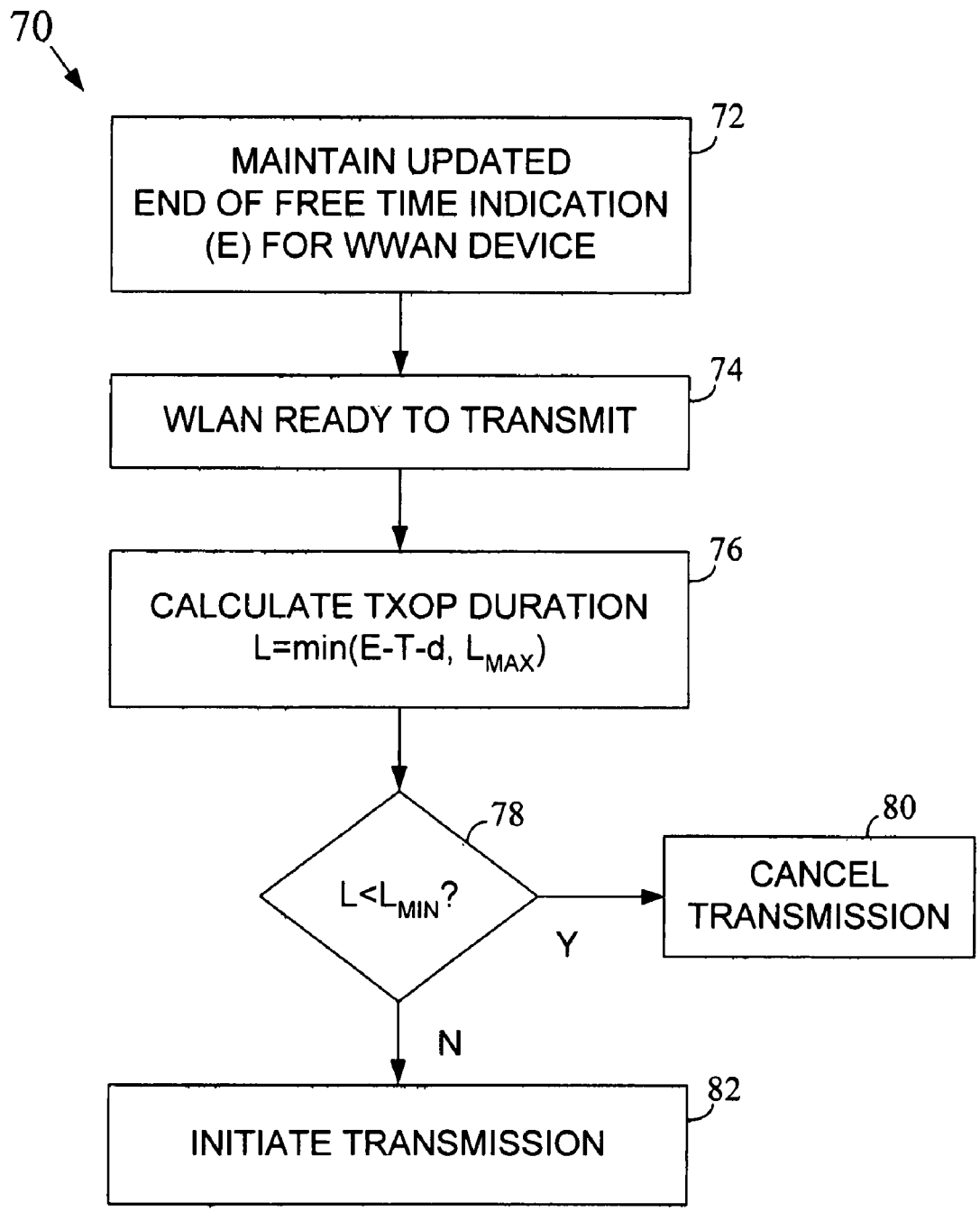
FIG. 4 is a flowchart illustrating an example method for managing a transmit operation for a WLAN transceiver in a dual radio wireless device in accordance with an embodiment of the present invention.

FIG. 4 is a flowchart illustrating an example method 70 for managing a transmit (uplink) operation for a WLAN transceiver in a dual radio wireless device in accordance with an embodiment of the present invention. An updated end of free time indication is maintained for a WWAN transceiver within the dual radio wireless device (block 72). The WLAN transceiver has access to this end of free time indication. At a time T, the WLAN transceiver may determine that it is ready to transmit (block 74). This may occur, for example, after the transceiver has already waited for a backoff period to expire (e.g., in accordance with the IEEE 802.11x standard). The WLAN transceiver may then calculate a new TXOP duration L using the end of free time indication (block 76). In at least one embodiment, this calculation may use Equation 1 set out above (although other equations may alternatively be used). It may next be determined whether the calculated value of TXOP duration L is less than a minimum duration $L_{MIN}$ (block 78). If so, then the WLAN transmit operation is canceled (block 80). If the WLAN transmit operation is canceled, then the WLAN transceiver may have to wait for the next backoff period to expire to attempt to transmit again. If the calculated value of TXOP duration L is not less than $L_{MIN}$, the WLAN transmit operation is initiated and allowed to proceed for the calculated TXOP duration L (block 82).

Figure 5:
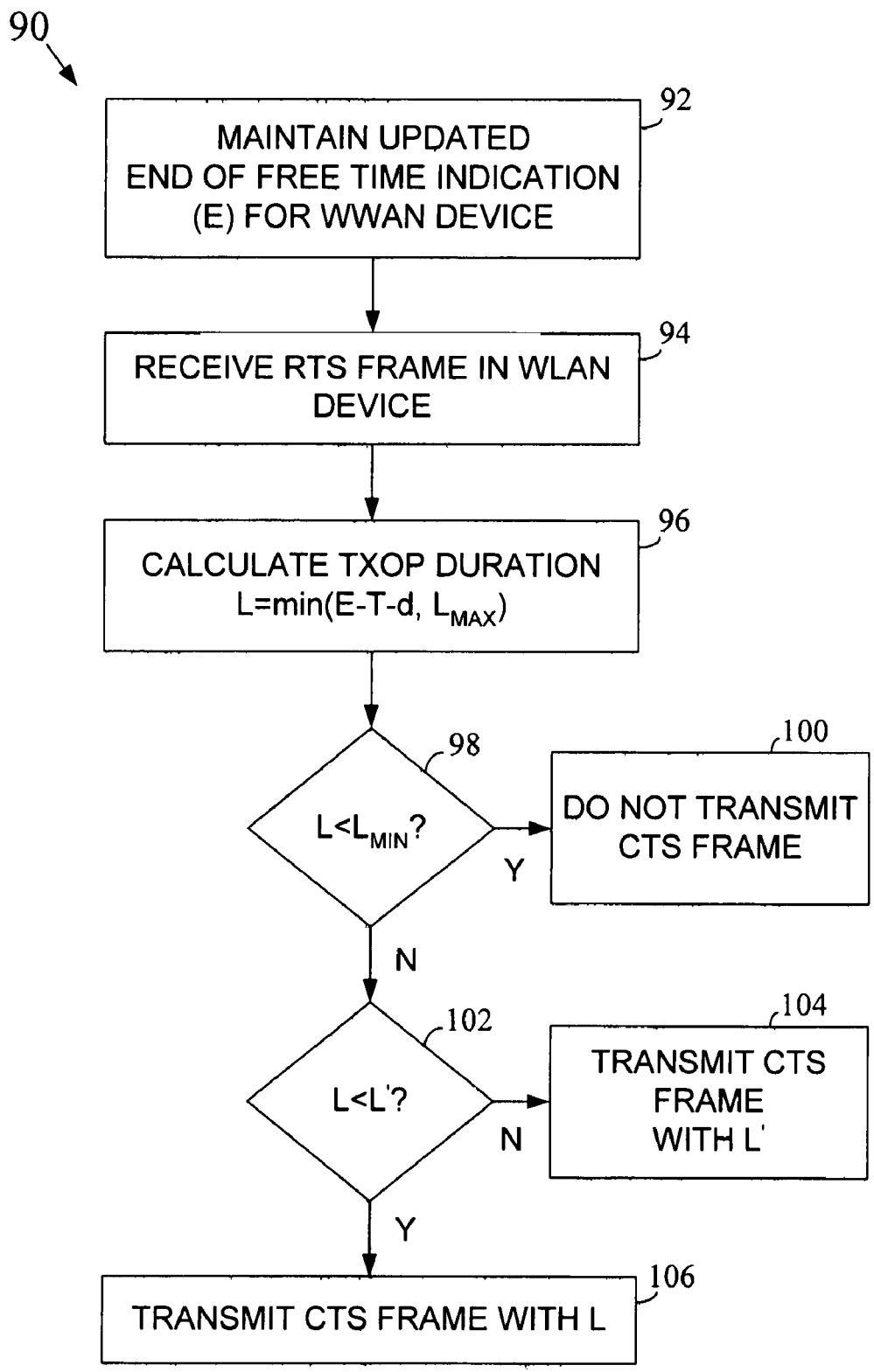
FIG. 5 is a flowchart illustrating an example method for managing a receive operation for a WLAN transceiver in a dual radio wireless device in accordance with an embodiment of the present invention.

FIG. 5 is a flowchart illustrating an example method 90 for managing a receive (downlink) operation for a WLAN transceiver in a dual radio wireless device in accordance with an embodiment of the present invention. An updated end of free time indication is maintained for a WWAN transceiver within the dual radio wireless device (block 92). The WLAN transceiver has access to this end of free time indication. A request-to-send (RTS) frame is received by the WLAN transceiver within the dual radio wireless device from a remote wireless entity (e.g., a WLAN AP) (block 94). In response to the RTS frame, a new TXOP duration L may be calculated using the end of free time indication associated with the WWAN transceiver (block 96). In at least one embodiment, this calculation may use Equation 1 set out above (although other equations may alternatively be used). It may next be determined whether the calculated value of TXOP duration L is less than a minimum TXOP duration $L_{MIN}$ (block 98). If so, then the WLAN transceiver will not transmit a clear-to-send (CTS) frame to the remote wireless entity in response to the RTS frame (block 100). If the calculated value of L is not less than $L_{MIN}$, the WLAN transceiver may next determine whether the calculated duration L is less than the TXOP duration value L' specified within the RTS frame (block 102). If not, a CTS frame is transmitted to the remote wireless entity with the L' value as the TXOP duration (block 104). If the calculated value of L is less than L', then a CTS frame is transmitted with the calculated L value as the TXOP duration (block 106).

When the remote wireless entity (e.g., a WLAN AP) receives the CTS frame that has the calculated L value as the TXOP duration, instead of the value L' that was included in the RTS frame, the entity will use the new duration value for the subsequent data transmission. After the remote wireless entity reaches the TXOP duration value during transmission, the entity may send out a CF-end frame command to notify its neighbors that the end of the TXOP has been reached (i.e., TXOP truncation).

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   maintaining an updated end of free time indication for a first wireless transceiver within a multiple radio wireless device, said end of free time indication being indicative of a point in time when said first wireless transceiver is scheduled to cease being inactive;
   determining that a second wireless transceiver within said multiple radio wireless device is ready to communicate; and
   calculating, in response to determining, a transmission opportunity (TXOP) duration L for said second wireless transceiver using said end of free time indication of said first wireless transceiver, wherein L is calculated using the equation:

$$L = \min(E - T - d, L_{MAX})$$

where E is the updated end of free time indication for said first wireless transceiver, T is the current time, d is a guard interval, $L_{MAX}$ is the maximum TXOP duration for said second wireless transceiver, L is the calculated TXOP duration for said second wireless transceiver, and min(a,b) is the function that selects the lowest of listed elements a and b.

2. The method of claim 1, wherein:
   maintaining an updated end of free time indication includes setting said end of free time indication to a current time when said first wireless transceiver is active.

3. The method of claim 1, wherein:
   determining that a second wireless transceiver within said multiple radio wireless device is ready to communicate includes determining that said second wireless transceiver is ready to transmit; and
   said method further comprises:
      when said calculated TXOP duration L for said second wireless transceiver is less than a minimum TXOP duration $L_{MIN}$, canceling transmission from said second wireless transceiver; and
      when L is not less than $L_{MIN}$, initiating transmission from said second wireless transceiver.

4. The method of claim 1, wherein:
   determining that a second wireless transceiver within said multiple radio wireless device is ready to communicate includes receiving a request-to-send (RTS) frame in said second wireless transceiver from a remote wireless entity that wishes to transmit data to said second wireless transceiver; and
   said method further comprises:

when said calculated TXOP duration L for said second wireless transceiver is less than a minimum TXOP duration $L_{MIN}$, refraining from transmitting a clear-to-send (CTS) frame back to said remote wireless entity;

when L is not less than $L_{MIN}$ but L is less than a TXOP duration L' identified within said RTS frame, transmitting a CTS frame that includes L to said remote wireless entity; and when L is not less than $L_{MIN}$ and L is also not less than L', transmitting a CTS frame that includes L' to said remote wireless entity.

5. The method of claim 1, wherein:
said first wireless transceiver is configured in accordance with a scheduling based wireless standard and said second wireless transceiver is configured in accordance with a contention based wireless standard.

6. The method of claim 1, further comprising:
determining that the second wireless transceiver within said multiple radio wireless device is ready to communicate during a period corresponding with the end of free time indication, wherein said second wireless transceiver is configured in accordance with a contention based wireless standard.

7. An apparatus comprising:
a first wireless transceiver configured in accordance with a scheduling based wireless standard, said first wireless transceiver having a first controller to maintain an updated end of free time indication for said first wireless transceiver, said end of free time indication being indicative of a point in time when said first wireless transceiver is scheduled to cease being inactive; and a second wireless transceiver configured in accordance with a contention based wireless standard, said second wireless transceiver including a second controller to: (a) determine that said second wireless transceiver is ready to communicate; and (b) calculate, in response to said determination, a transmission opportunity (TXOP) duration L for said second wireless transceiver using said end of free time indication of said first wireless transceiver, wherein L is calculated using the equation:

$$L=\min(E-T-d, L_{MAX})$$

where E is the updated end of free time indication for said first wireless transceiver, T is the current time, d is a guard interval, $L_{MAX}$ is the maximum TXOP duration for said second wireless transceiver, L is the calculated TXOP duration for said second wireless transceiver, and min(a,b) is the function that selects the lowest of listed elements a and b.

8. The apparatus of claim 7, wherein:
said first controller sets said end of free time indication to a current time when said first wireless transceiver is active.

9. The apparatus of claim 7, wherein:
said second controller determines that said second wireless transceiver is ready to communicate when said second controller determines that said second wireless transceiver is ready to transmit; and said second controller further operates to: (a) when said calculated TXOP duration L for said second wireless transceiver is less than a minimum TXOP duration $L_{MIN}$, cancel transmission from said second wireless transceiver; and (b) when L is not less than $L_{MIN}$, initiate transmission from said second wireless transceiver.

10. The apparatus of claim 7, wherein:
said second controller determines that said second wireless transceiver is ready to communicate when said second wireless transceiver receives a request-to-send (RTS) frame from a remote wireless entity that wishes to transmit data to said second wireless transceiver; and said second controller further operates to: (a) when said calculated TXOP duration L for said second wireless transceiver is less than a minimum TXOP duration $L_{MIN}$, refrain from transmitting a clear-to-send (CTS) frame back to said remote wireless entity; (b) when L is not less than $L_{MIN}$ but L is less than a TXOP duration L' identified within said RTS frame, transmit a CTS frame that includes L to said remote wireless entity; and (c) when L is not less than $L_{MIN}$ and L is also not less than L', transmit a CTS frame that includes L' to said remote wireless entity.

11. An article comprising a computer readable storage medium having instructions stored thereon that, when executed by a computing platform, operate to:
maintain an updated end of free time indication for a first wireless transceiver within a multiple radio wireless device, said end of free time indication being indicative of a point in time when said first wireless transceiver is scheduled to cease being inactive;

determine that a second wireless transceiver within said multiple radio wireless device is ready to communicate; and calculate, in response to said determination, a transmission opportunity (TXOP) duration L for said second wireless transceiver using said end of free time indication of said first wireless transceiver, wherein L is calculated using the equation:

$$L=\min(E-T-d, L_{MAX})$$

where E is the updated end of free time indication for said first wireless transceiver, T is the current time, d is a guard interval, $L_{MAX}$ is the maximum TXOP duration for said second wireless transceiver, L is the calculated TXOP duration for said second wireless transceiver, and min (a,b) is the function that selects the lowest of listed elements a and b.

12. The article of claim 11, wherein:
operation to maintain an updated end of free time indication includes operation to set said end of free time indication to a current time when said first wireless transceiver is active.

13. The article of claim 11, wherein:
operation to determine that a second wireless transceiver within said multiple radio wireless device is ready to communicate includes operation to determine that said second wireless transceiver is ready to transmit; and said instructions further operate to:
when said calculated TXOP duration L for said second wireless transceiver is less than a minimum TXOP duration $L_{MIN}$, cancel transmission from said second wireless transceiver; and when L is not less than $L_{MIN}$, initiate transmission from said second wireless transceiver.

14. The article of claim 11, wherein:
operation to determine that a second wireless transceiver within said multiple radio wireless device is ready to communicate includes operation to receive a request-to-send (RTS) frame in said second wireless transceiver from a remote wireless entity that wishes to transmit data to said second wireless transceiver; and said instructions further operate to:
when said calculated TXOP duration L for said second wireless transceiver is less than a minimum TXOP duration $L_{MIN}$, refrain from transmitting a clear-to-send (CTS) frame back to said remote wireless entity;

when L is not less than $L_{MIN}$ but L is less than a TXOP duration L' identified within said RTS frame, transmit a CTS frame that includes L to said remote wireless entity; and when L is not less than $L_{MIN}$ and L is also not less than L', transmit a CTS frame that includes L' to said remote wireless entity.

15. The article of claim 11, wherein:

said first wireless transceiver is configured in accordance with a scheduling based wireless standard and said second wireless transceiver is configured in accordance with a contention based wireless standard.

16. The article of claim 11, wherein:

determine said second wireless transceiver within said multiple radio wireless device is ready to communicate during a period corresponding with the end of free time indication, wherein said second transceiver is configured in accordance with a contention based wireless standard.

* * * * *